United States Patent [19]
Talmadge

[11] Patent Number: 5,287,748
[45] Date of Patent: Feb. 22, 1994

[54] METHOD AND APPARATUS FOR CHANGING THE SENSITIVITY OF A TRANSDUCER

[75] Inventor: Paul C. Talmadge, Ansonia, Conn.

[73] Assignee: Pitney Bowes Inc., Stamford, Conn.

[21] Appl. No.: 876,994

[22] Filed: May 1, 1992

[51] Int. Cl.$^5$ .............................................. G01L 1/26
[52] U.S. Cl. .................... 73/769; 73/862.52; 177/164; 324/605
[58] Field of Search ............ 73/769, 771, 772, 862.52; 177/211, 164; 331/65; 364/567, 568, 508; 374/128, 170; 324/602, 603, 605-607

[56] References Cited

U.S. PATENT DOCUMENTS

| | | | |
|---|---|---|---|
| 2,924,967 | 2/1960 | Gieseler | 73/769 |
| 3,437,160 | 4/1969 | Hill | 177/211 |
| 4,316,518 | 2/1982 | Jonath . | |
| 4,375,243 | 3/1983 | Doll . | |
| 4,417,631 | 11/1983 | Johnson . | |
| 4,632,198 | 12/1986 | Uchimura . | |
| 4,690,230 | 9/1987 | Uchimura et al. . | |
| 4,722,406 | 2/1988 | Naito . | |
| 4,778,016 | 10/1988 | Uchimura . | |
| 4,981,187 | 1/1991 | Masuyama et al. | 177/211 |
| 5,088,330 | 2/1992 | Talmadge . | |

FOREIGN PATENT DOCUMENTS 1174085 12/1966 United Kingdom .
1474788 6/1973 United Kingdom .

OTHER PUBLICATIONS

2 Articles; Crystal Semiconductor Conductor, dated May 1989 and Jul. 1991.

*Primary Examiner*—Robert Raevis
*Attorney, Agent, or Firm*—Robert H. Whisker; Melvin J. Scolnick

[57] ABSTRACT

A method of changing the sensitivity of a transducer includes applying to the transducer a cyclic excitation signal. The excitation signal has a number of recurring phases of different amplitudes. The transducer's output signal has a like number of recurring phases, each of which corresponds to a phase of the excitation signal. One of the phases of the output signal is selected for data acquisition. Selection of a different phase changes the effective measuring range of the transducer. Preferably, the excitation signal is an a.c. signal, and the output signal is partially demodulated as part of the selection of a phase for data acquisition.

8 Claims, 20 Drawing Sheets

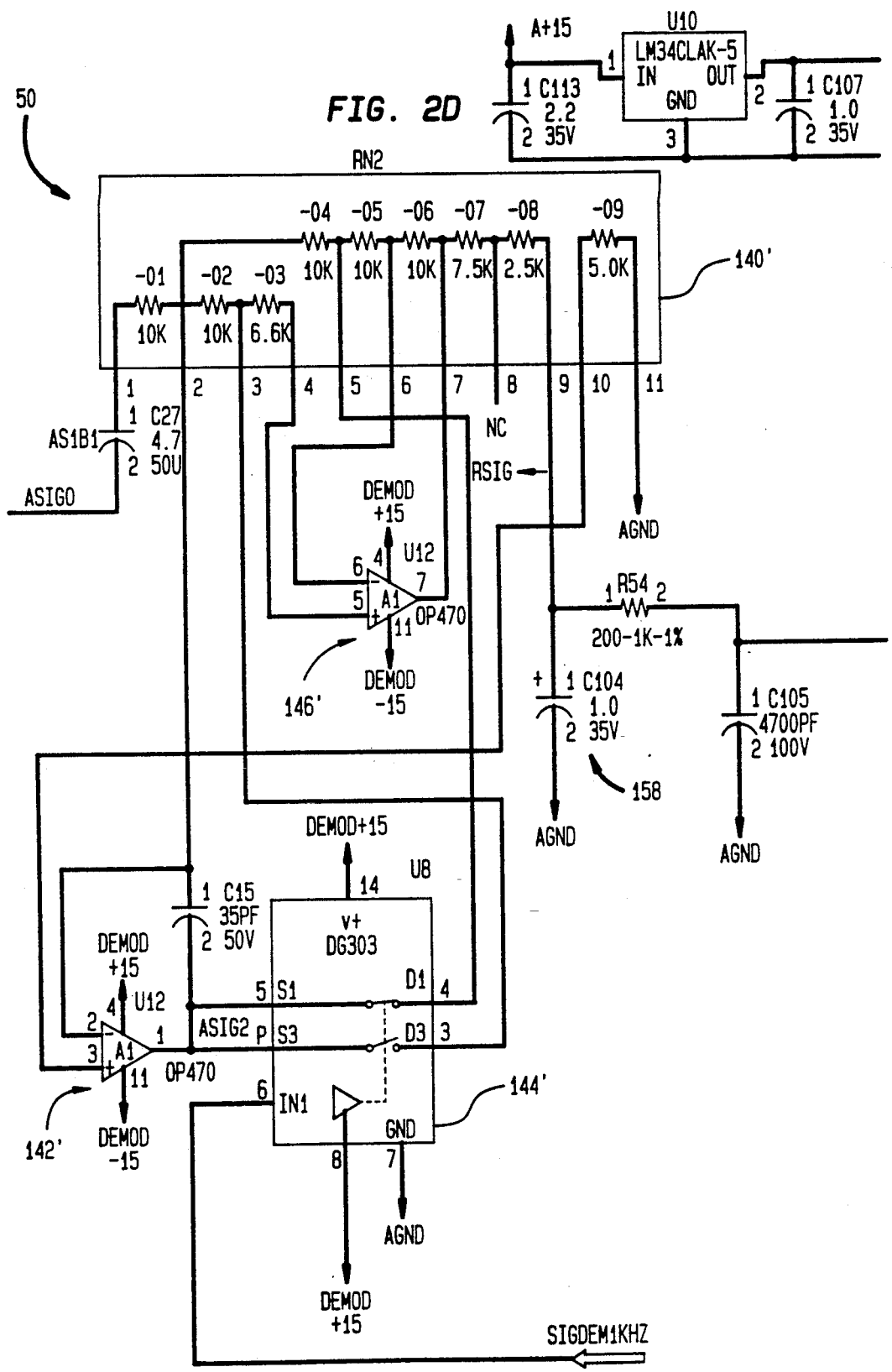

METHOD AND APPARATUS FOR CHANGING THE SENSITIVITY OF A TRANSDUCER

FIELD OF THE INVENTION

This invention relates to a method and apparatus for changing the accuracy range of a load cell or other type of transducer.

BACKGROUND OF THE INVENTION

It is often desirable to use a single measuring device, such as a weighing scale, to perform a wide range of measurements. For instance, a postal scale may be used to weigh very light items such as letters weighing one ounce, and also relatively heavy items such as packages weighing several pounds or more. Typically the light items are to be weighed quite accurately; for letter mail accuracy to the nearest 1/32 ounce is desired. Less accurate weighing is usually required for the heavier items. It is known to provide weighing scales with two or more weighing ranges: a highly accurate low range for weighing light items and one or more less accurate high ranges for heavier items. As previously proposed, multirange scales have included two or more load cells, mechanically coupled in tandem in such a manner that the item to be weighed is supported by all of the load cells. One load cell is suitable for providing the low weighing range and the other load cell or cells provide the higher range or ranges. Such scales also include electronic componentry for receiving, conditioning and processing the outputs of all of the load cells. Patents disclosing such scales include U.S. Pat. No. 4,375,243 (to Doll), U.S. Pat. No. 4,690,230 (to Uchimura et al.), U.S. Pat. No. 4,778,016 (to Uchimura et al.) and U.S. Pat. No. 4,632,198 (to Uchimura).

A number of disadvantages attend multiple load cell scales. For example, the cost of producing the scale is increased by the cost of the additional load cell or cells and also by the cost of the additional electronic components associated with each load cell. Additional costs result from the structure required for mounting the additional load cell or cells.

It is therefore desirable to provide a multiple range measuring device, such as a weighing cell, that uses a single transducer.

SUMMARY OF THE INVENTION

According to the invention, a method of changing the sensitivity of a transducer includes the steps of:

(a) applying a cyclic excitation signal to the transducer, the excitation signal having a plurality of recurring phases of different amplitudes;

(b) receiving an output signal from the transducer, the output signal having a like plurality of recurring phases corresponding to the phases of the excitation signal; and (c) selecting for data acquisition one of the recurring phases of the output signal.

BRIEF DESCRIPTION OF THE DRAWINGS

FIGS. 5-B and 5-C are wave-form illustrations of operation of demodulator circuitry in accordance with the invention.

FIGS. 5-D and 5-E are wave-form illustrations of demodulated strain gage output signals in accordance with the invention.

DETAILED DESCRIPTION OF PREFERRED EMBODIMENTS OF THE SUBJECT INVENTION

A. Description of Force-Measuring Device that may be modified in accordance with the invention

1. Overview of Force-Measuring Device

An overview will first be presented of a force-measuring device that may be conveniently modified in accordance with the present invention. Reference is made to U.S. Pat. No. 5,088,330 and patent application Ser. No. 07/619,579 (Attorney docket no. C-721), filed on Nov. 29, 1990 by the applicant of the present application and both assigned to the assignee hereof. The disclosure of this patent and application is incorporated herein by reference.

Figure 1:
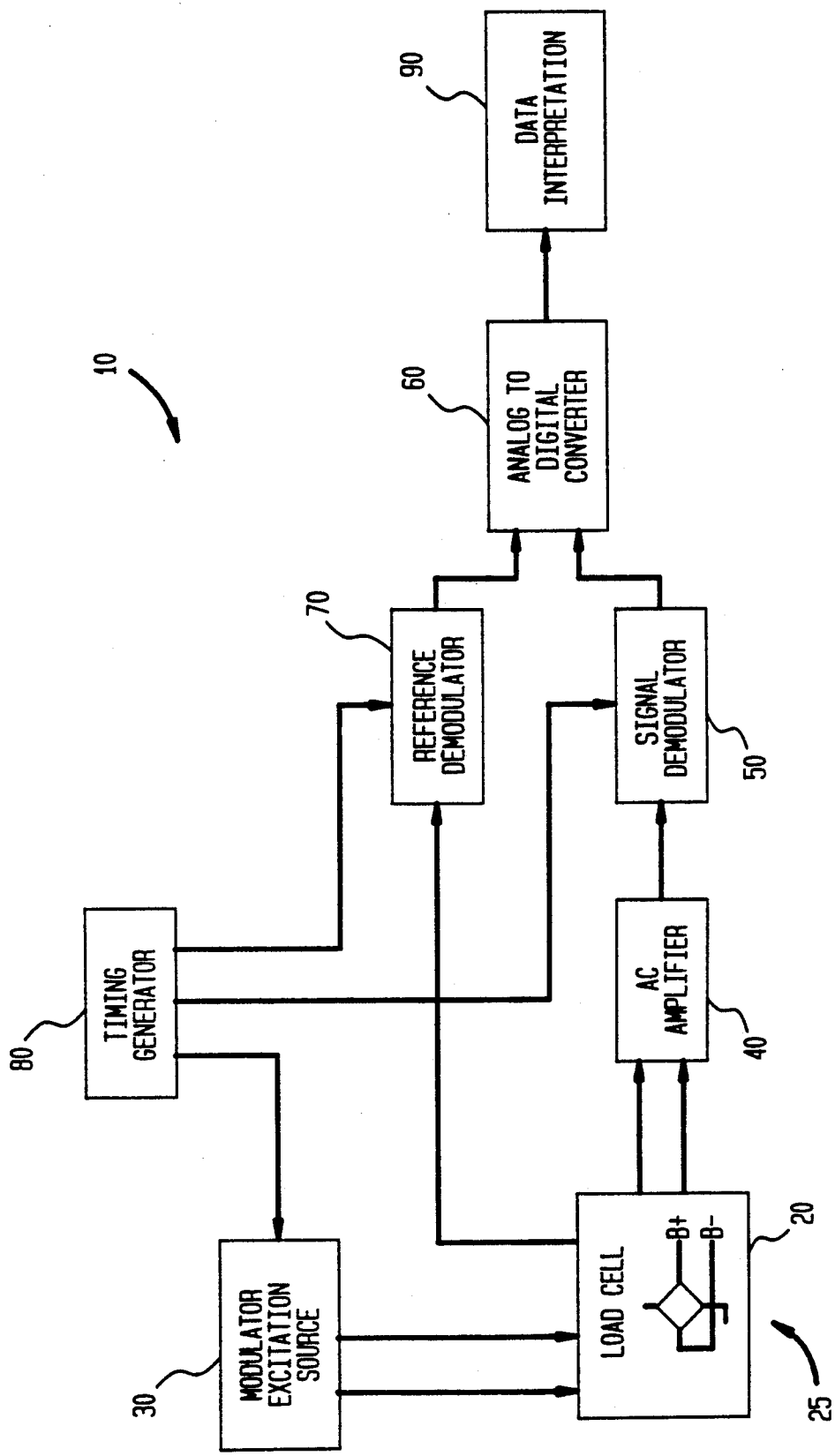
FIG. 1 is a schematic block diagram of the electronic circuitry of a force measuring apparatus that may be conveniently modified to carry out the inventive method.

FIG. 1 shows in schematic form the major functional blocks of a force-measuring device 10. Device 10 includes load cell 20, which comprises one or more strain gages arranged in a resistor bridge 25. Load cell 20 may, for example, be the model PW 2C3 available from Hottinger Baldwin Measurements, Inc., Marlboro, Mass. or the model 1040 available from Tedea, Inc., Canoga Park, Calif. Modulator excitation source 30 converts a precise, stable d.c. voltage into a square wave that is applied in a push-pull arrangement to resistor bridge 25.

The output of resistor bridge 25, reflecting the force applied to load cell 20, is amplified by a.c. amplifier 40, and then demodulated by signal demodulator 50. The d.c. signal output by signal demodulator 50 is converted into a digital signal by A/D converter 60. The reference voltage for A/D converter 60 is provided by reference demodulator 70, which demodulates the square wave excitation signal that is applied to resistor bridge 25.

Timing signals for modulator excitation source 30, signal demodulator 50 and reference demodulator 70 are provided by timing generator 80. The digital signal output by A/D converter 60 is received by data interpretation circuitry 90.

In its physical realization, device 10 may be, for example, a weighing scale of the type disclosed in U.S. Pat. No. 5,072,799, and assigned to the assignee of this application. The disclosure of U.S. Pat. No. 5,072,799 is incorporated herein by reference.

2. Detailed Description of Force-Measuring Device

FIGS. 2A-2J illustrate in more detail the circuitry of FIG. 1. (Dividing line 95 of FIG. 2 defines two convenient sub-groupings of FIGS. 2A-2J.)

Figure 2:
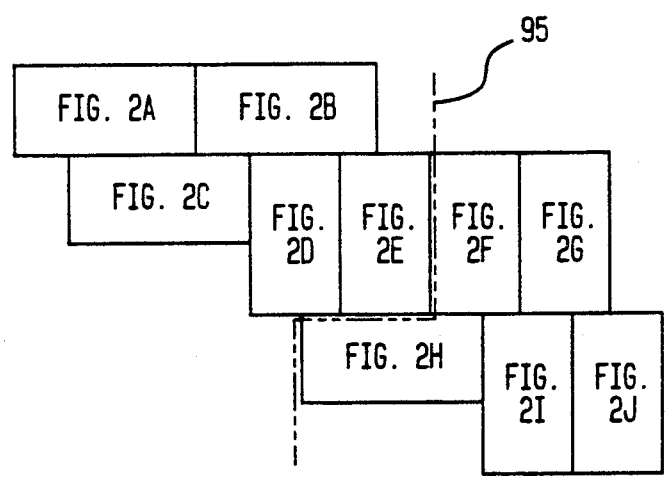
FIG. 2 is an interconnection diagram of FIGS. 2A-2J, which together are a schematic representation of the circuitry of FIG. 1.
Figure 2A:
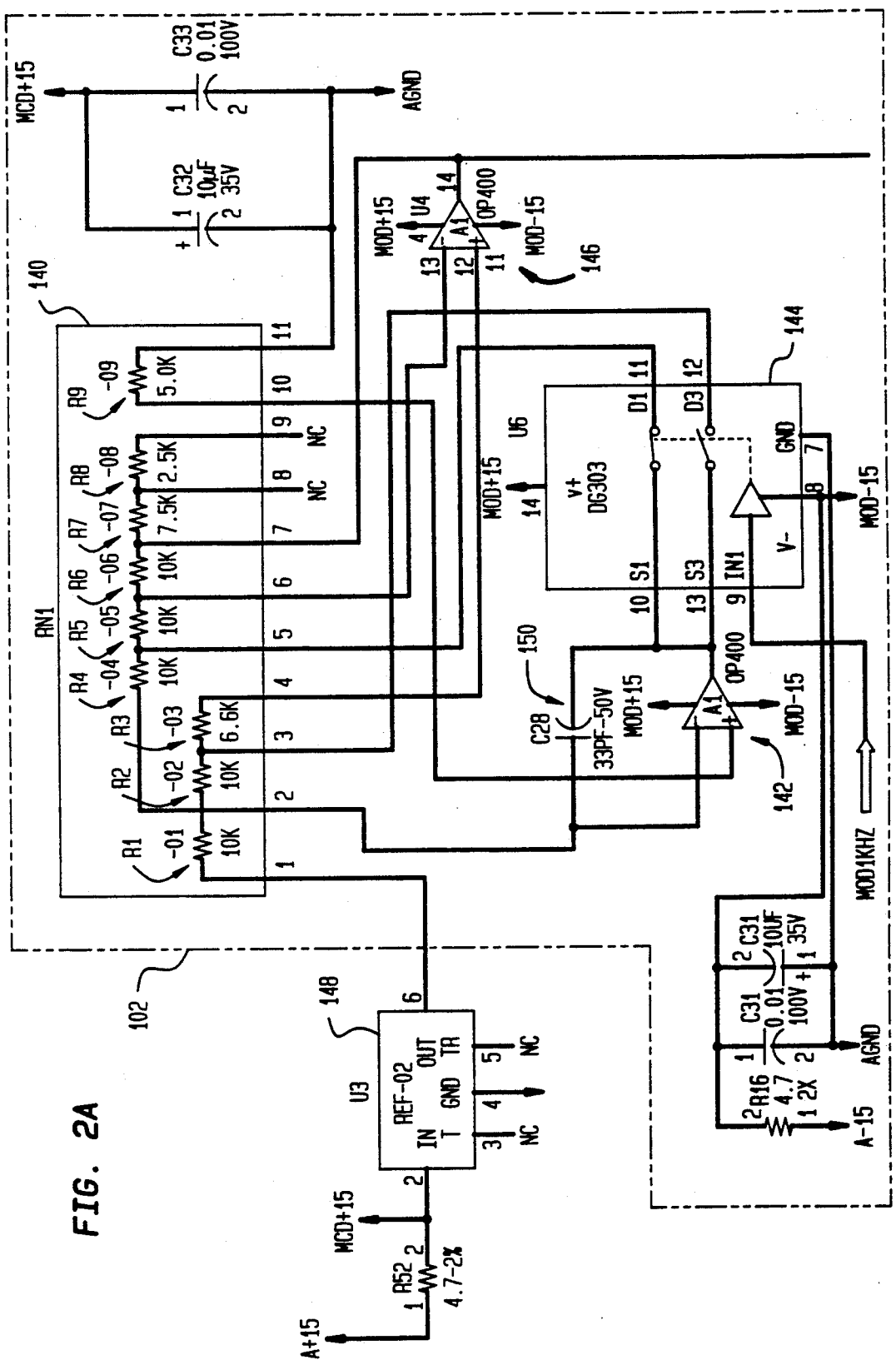
Figure 2B:
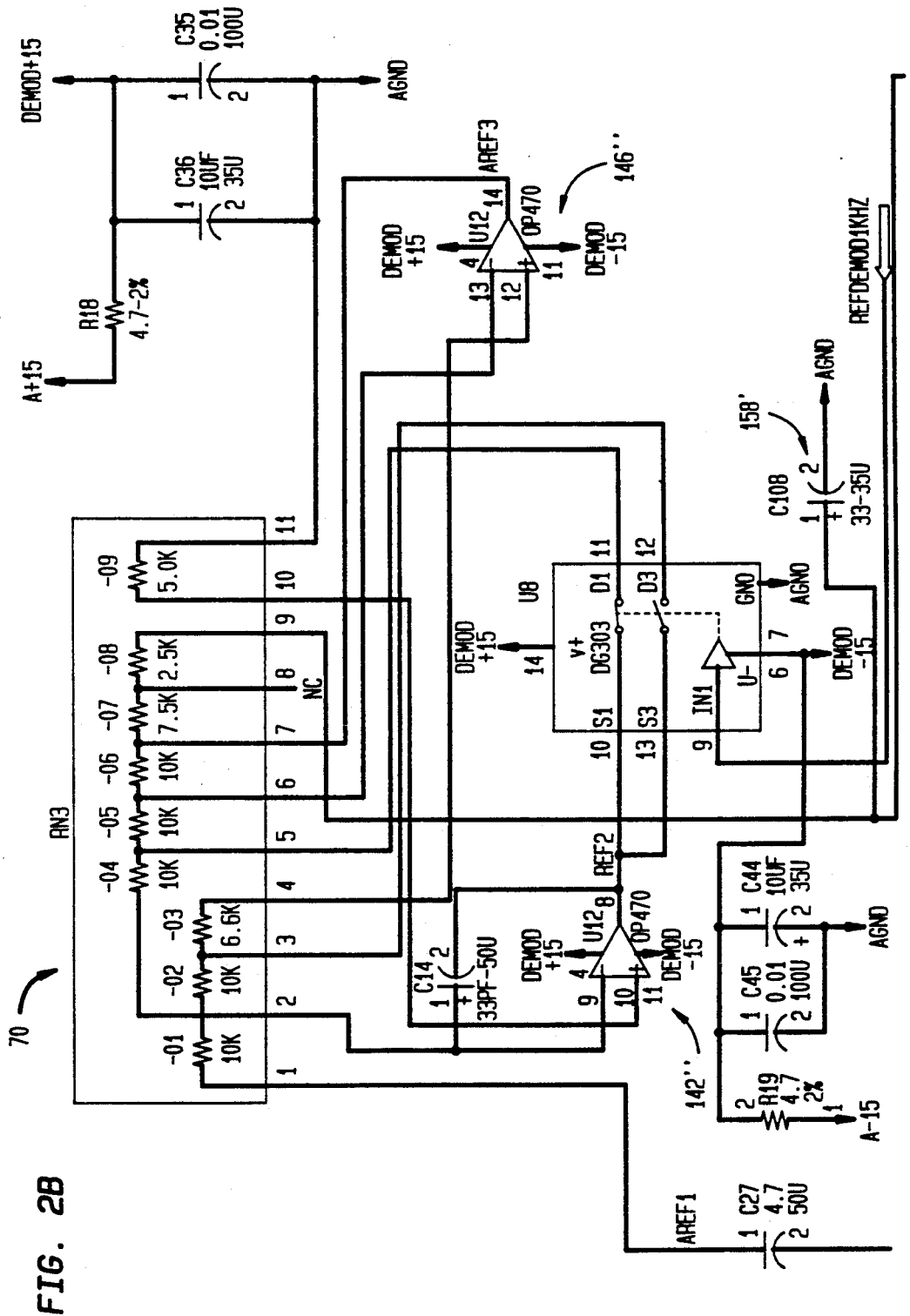
Figure 2C:
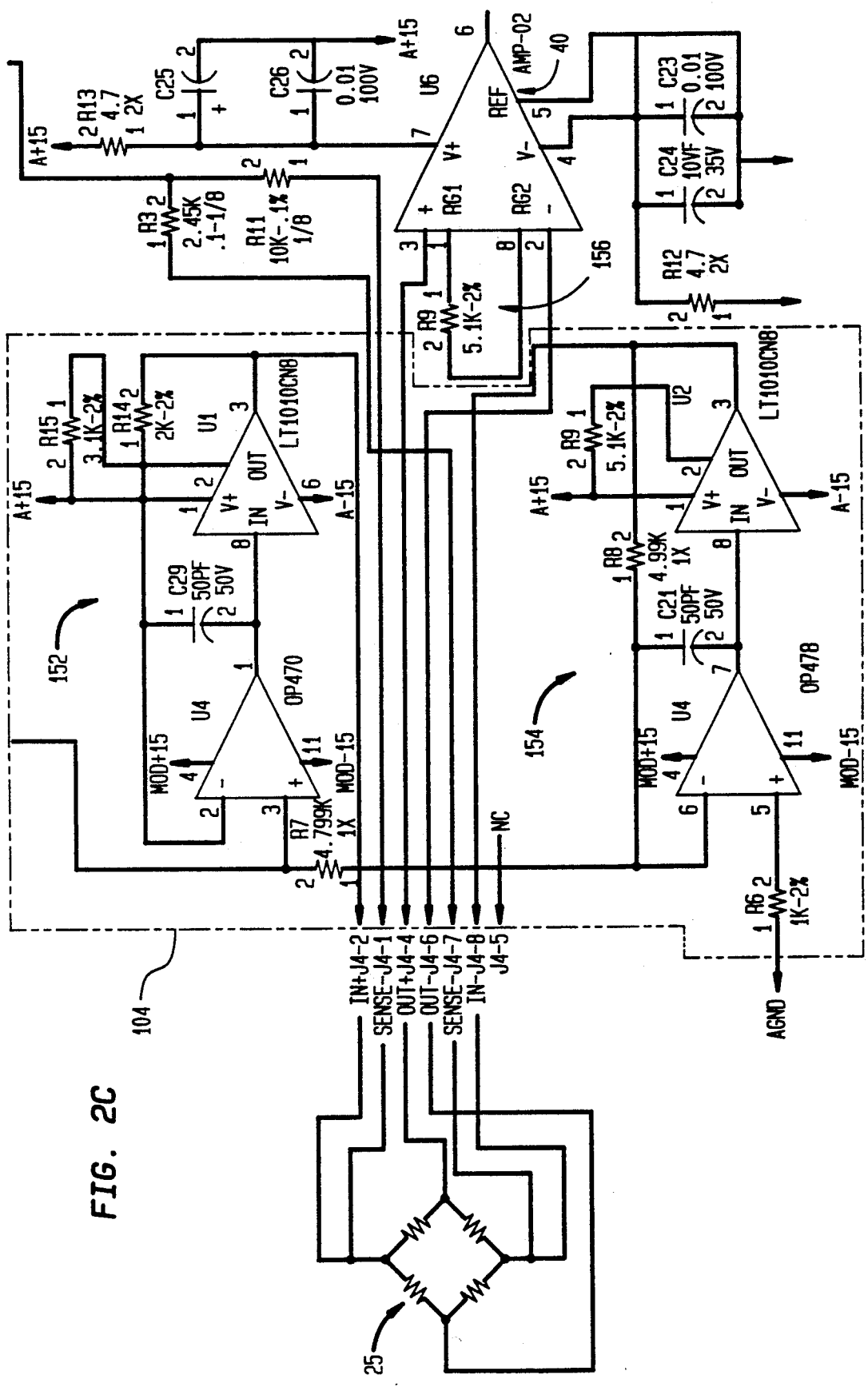
Figure 2E:
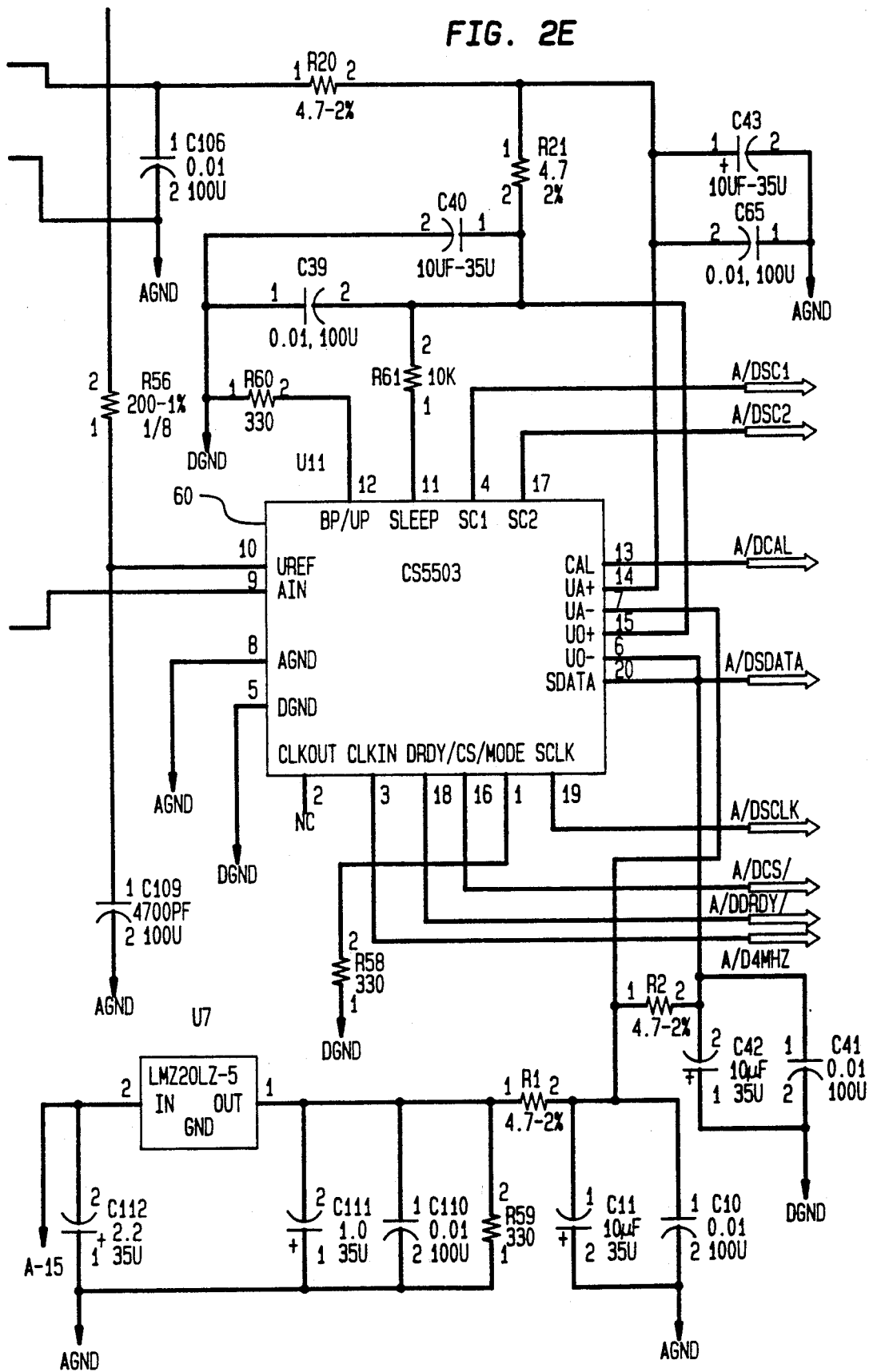

Corresponding to modulator excitation source 30 of FIG. 1 are modulator circuit 102 (FIG. 2A) and push pull amplifier stage 104 (FIG. 2C). Resistor bridge 25 is found on FIG. 2C, a.c. amplifier 40 on FIG. 2C, signal demodulator 50 on FIG. 2D, A/D converter 60 on FIG. 2E, and reference demodulator 70 on FIG. 2B. Timing generator 80 is realized by use of microcontroller 106 (FIG. 2E) which produces timing signals under software control. Divide-by-two driving stage 108 (FIG. 2G) also makes up part of the timing generator.

Microcontroller 106 may be, for example, a model 80C51FB available from Intel Corporation, Santa Clara, Calif. Associated with microcontroller 106 are address latch 110, program ROM 112, and RAM 114 (FIG. 2I).

Address bus 116 and multiplexed address and data bus 118 interconnect microcontroller 106, latch 110, ROM 112 and RAM 114. Pull-up resistors 120 (FIG. 2F) are provided for bus 118.

Figure 2F:
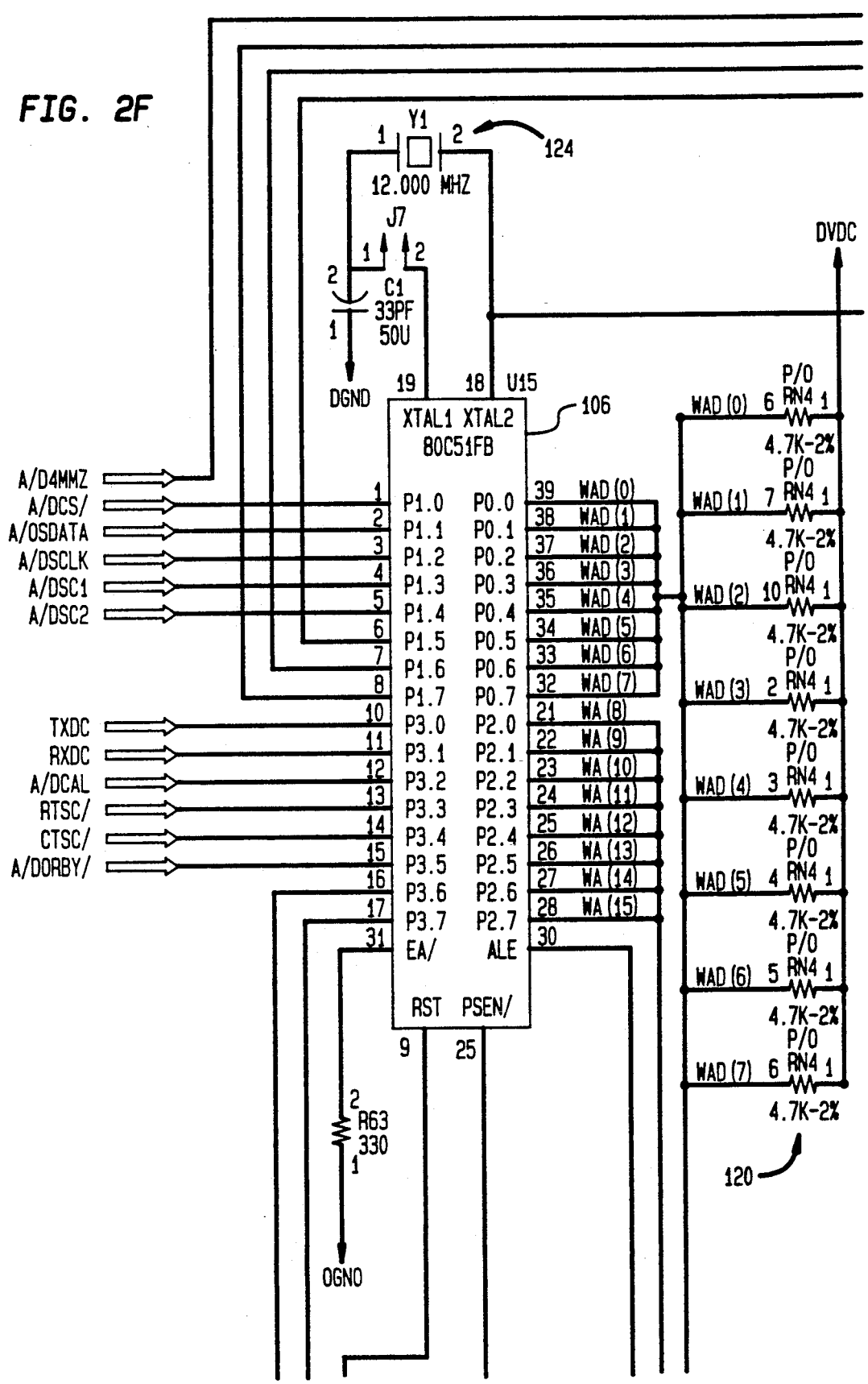
Figure 2G:
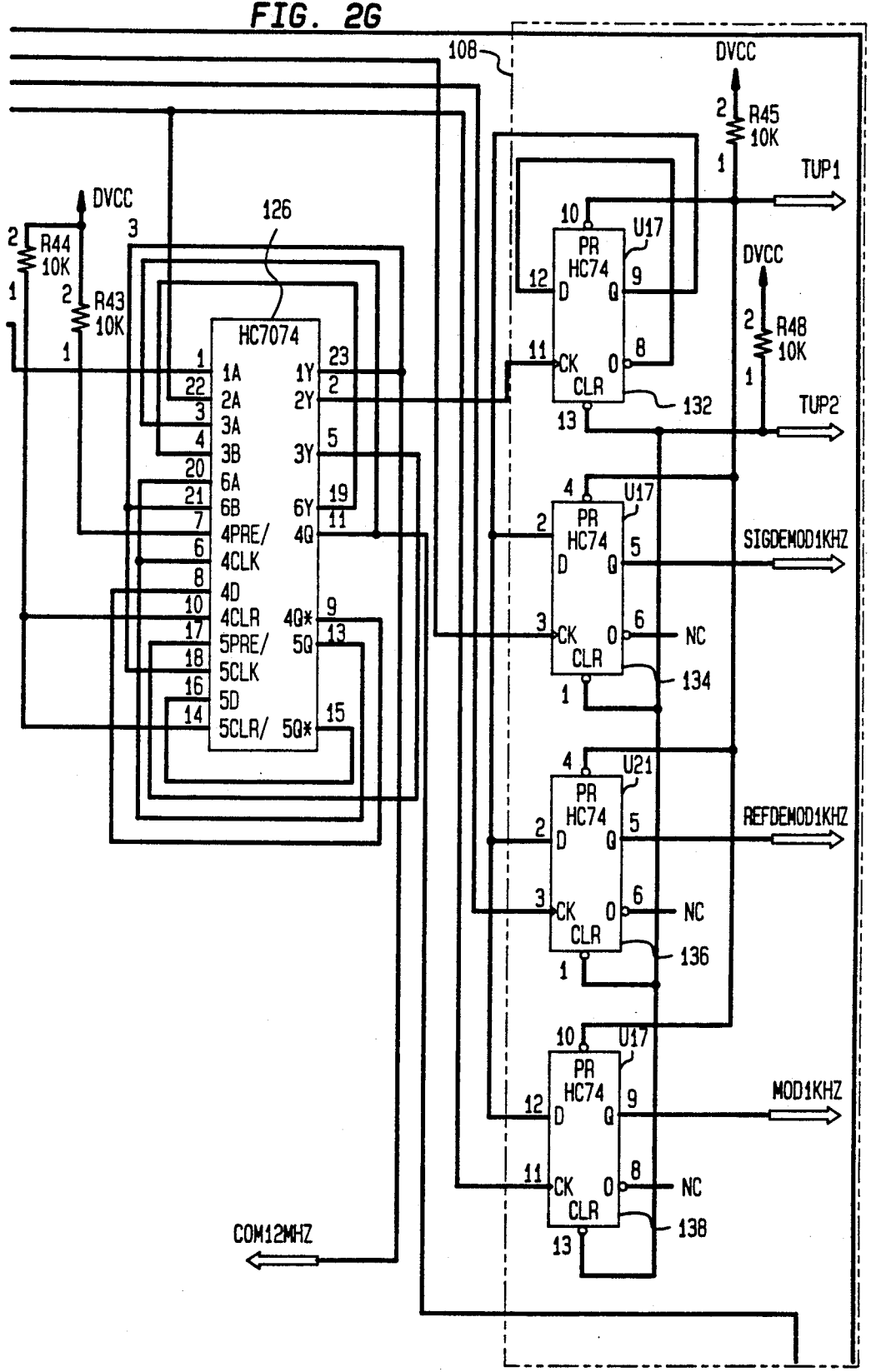
Figure 2H:
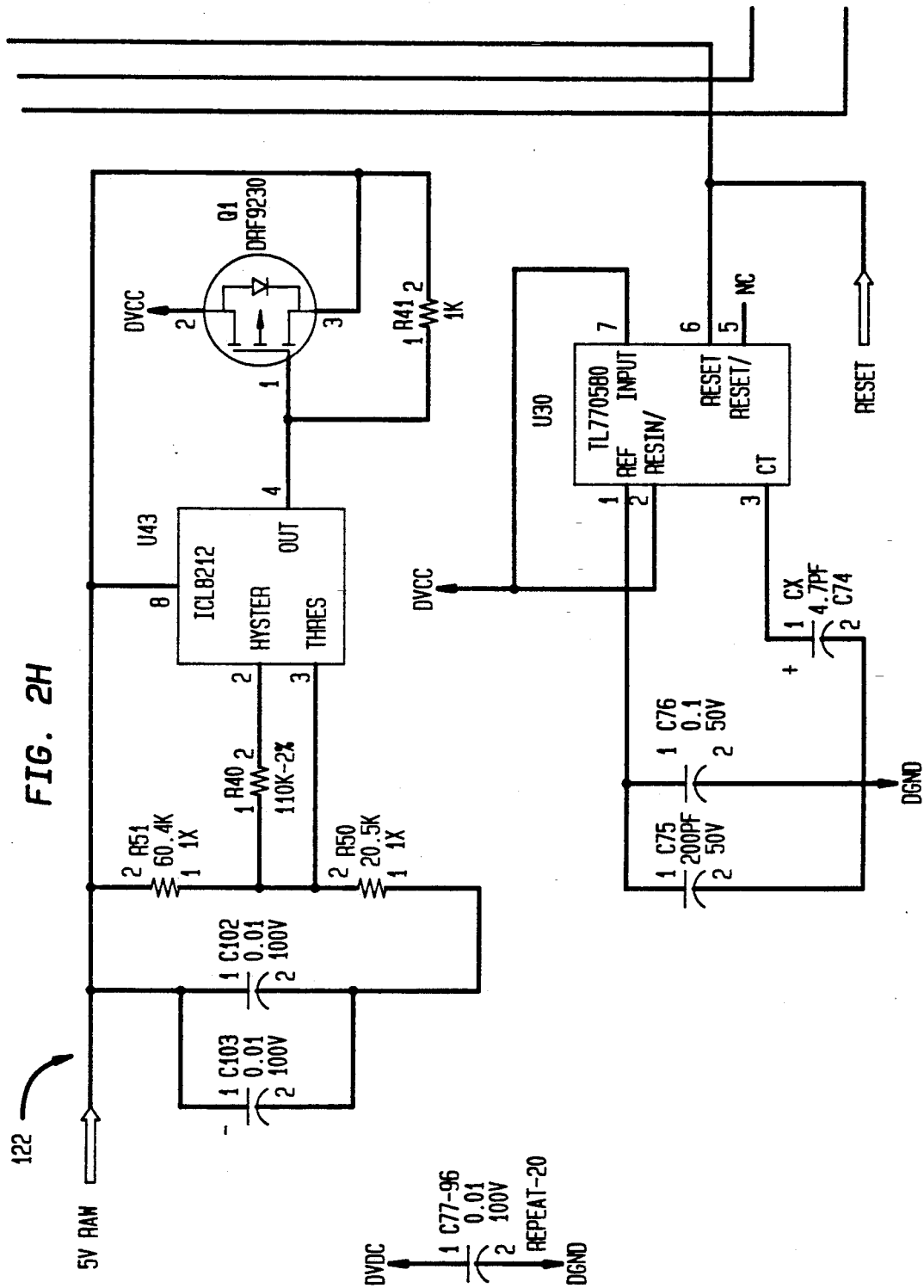
Figure 2I:
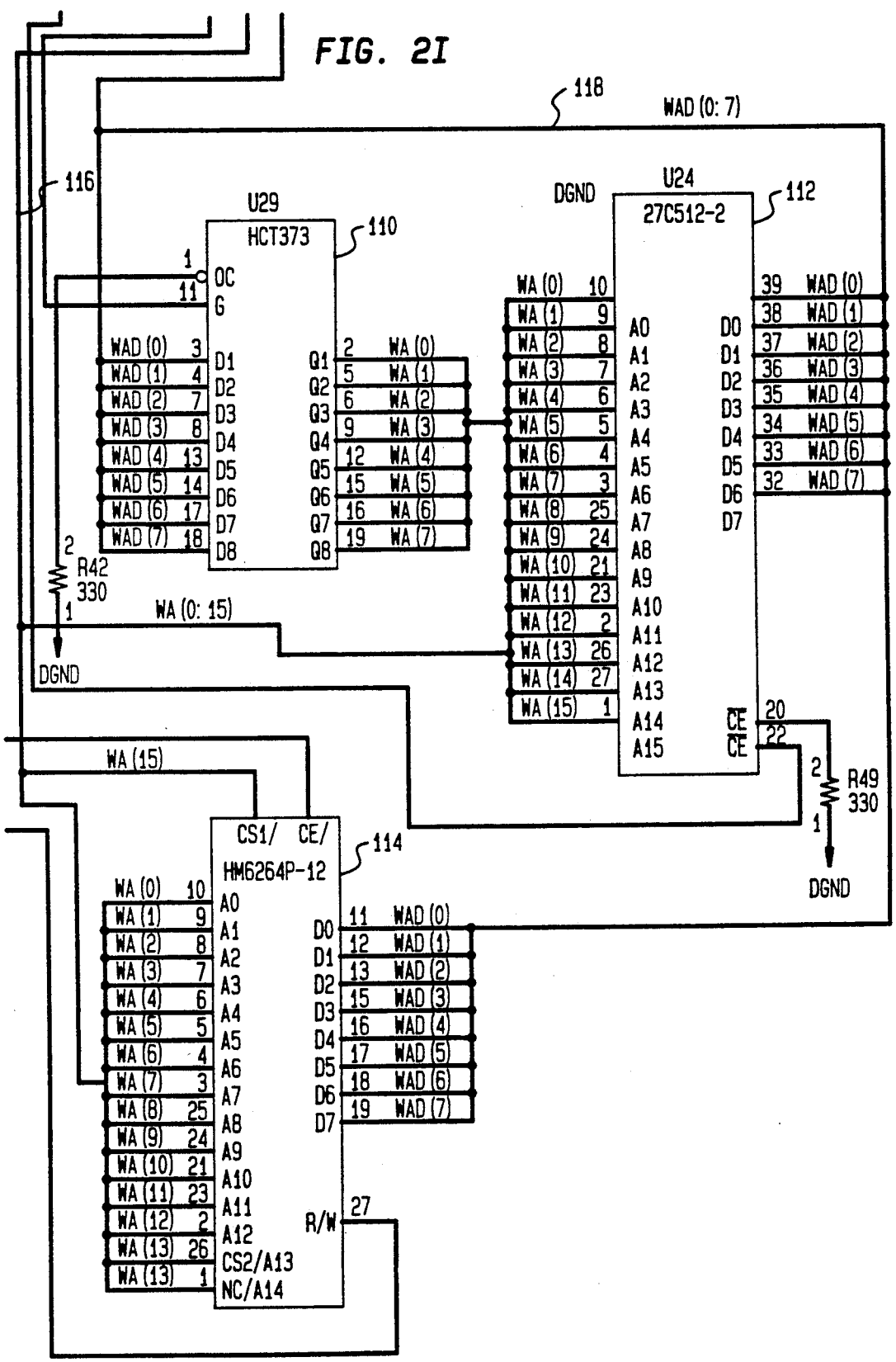

Also associated with microcontroller 106 are conventional start-up control circuitry 122 (FIG. 2H) and a crystal clock source 124 for a 12 MHZ signal (FIG. 2F).

Figure 2J:
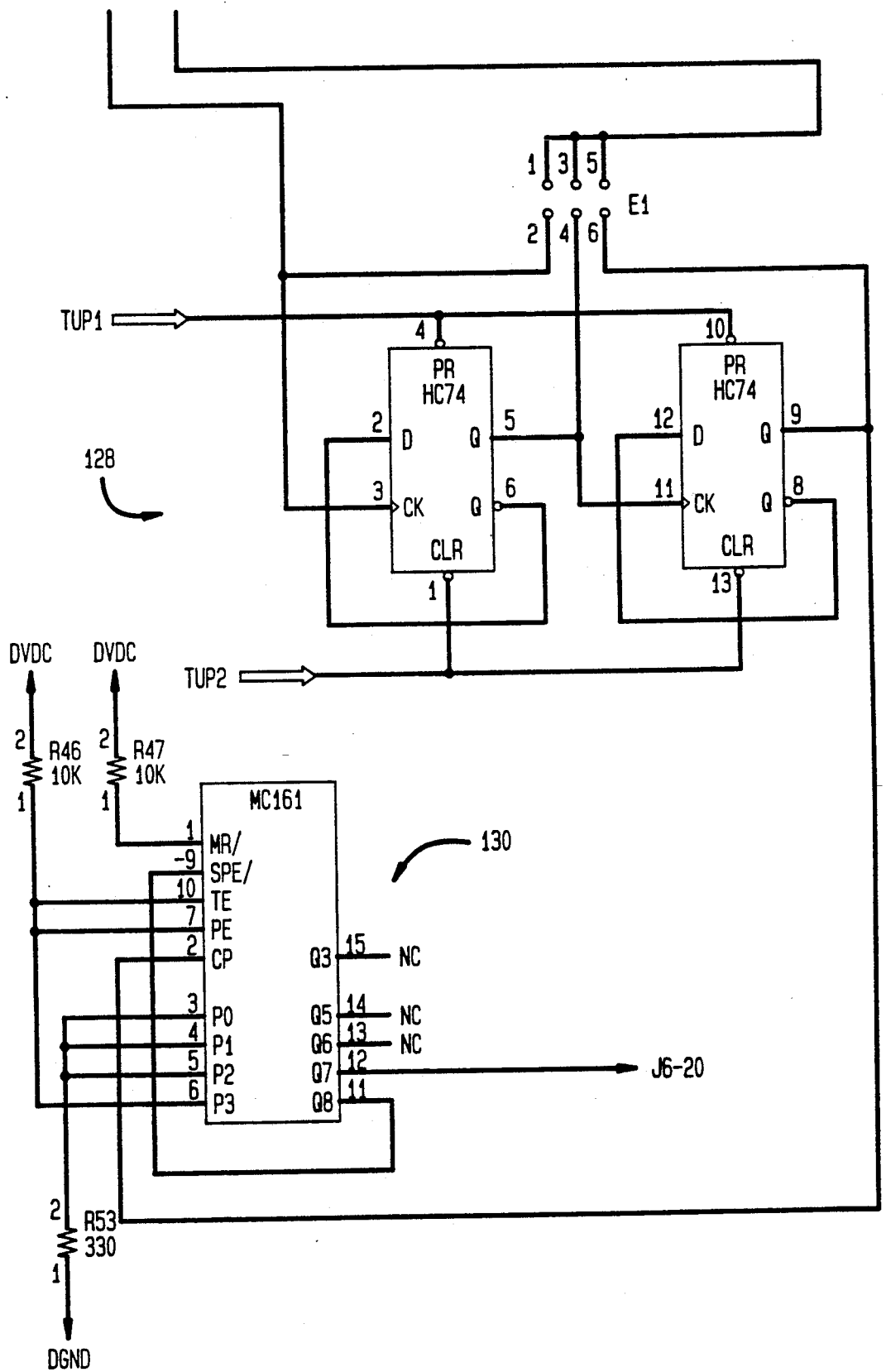

IC 126 (FIG. 2G) is connected to crystal 124 so as to provide a buffer for furnishing the 12 MHZ signal to the rest of the system. The input capacitance of the buffer provides shunt capacitance for one leg of crystal 124. IC 126 also comprises two D-type flip-flops, a NAND gate and a NOR gate arranged as a divide-by-three circuit in order to convert the 12 MHZ clock signal from crystal 124 into a 4 MHZ clock signal required by A/D converter 60. Also receiving the 4 MHZ clock signal are: frequency selector circuit 128 (FIG. 2J), which controls the bandwidth for the digital filter of A/D converter 60; and display clock driver 130 (FIG. 2J).

Data interpretation circuitry 90 of FIG. 1 is realized in part by microcontroller 106 which receives the output of A/D converter 60. Microcontroller 106 transmits data to a second microcontroller (not shown) which performs such functions as noise reduction and/or averaging and/or conversion to pounds or kilograms, etc. The second microcontroller may also be interfaced for communication of weight data to a microprocessor (not shown) or other device that may use the weight data for such purposes as postal rate calculations.

3. Operation of Force-Measuring Device

Operation of force-measuring device 10 will now be discussed in detail, commencing with generation of modulator and demodulator timing signals by microcontroller 106 and driving stage 108.

Driving stage 108 (FIG. 2G) comprises D-type flip-flops 132, 134, 136, 138. A 2 KHZ clock signal output by microcontroller 106 is buffered by an inverter of IC 126 and then received at the clock input of flip-flop 132. Flip-flop 132 is arranged to change state upon each clock pulse. As a result, the output of flip-flop 132 cycles at a rate of 1 KHZ. The next state of flip-flops 134, 136, 138 is determined by the receipt of clock pulses from microcontroller 106. Flip-flop 138 receives the same 2 KHZ clock signal that is applied to the aforesaid inverter of IC 126. Flip-flop 138 outputs a 1 KHZ square wave timing signal to modulator 102. Flip-flops 134, 136 respectively output 1 KHZ square wave timing signals to signal demodulator 50 and to reference demodulator 70.

As will be appreciated by those skilled in the art, each positive-going edge and each negative-going edge of the 1 KHZ signals output by flip-flops 134, 136, 138 occurs in response to a positive-going edge of the 2 KHZ clock signals respectively received by the three flip-flops. This arrangement assures symmetry of the 1 KHZ signals output by the three flip-flops.

As will also be appreciated, the relative timing of the 1 KHZ output signals may be adjusted by changing the relative timing of the three 2 KHZ clock signals produced by microcontroller 106. As was mentioned above, the timing of signals output by microcontroller 106 is subject to software control and so may be changed by reprogramming. In the embodiment disclosed herein, microcontroller 106 is programmed so that the respective outputs of flip-flop 134 (to signal demodulator 50) and flip-flop 136 (to reference demodulator 70), are in phase with each other and lag the output of flip-flop 138 (to modulator 102) by 34 microseconds, resulting in synchronous demodulation as discussed in more detail below.

Turning now to the operation of modulator 102 (FIG. 2A), it will be observed that modulator 102 includes precision resistor network 140, a first operational amplifier 142, a switching circuit 144 and a second operational amplifier 146.

Figure 3:
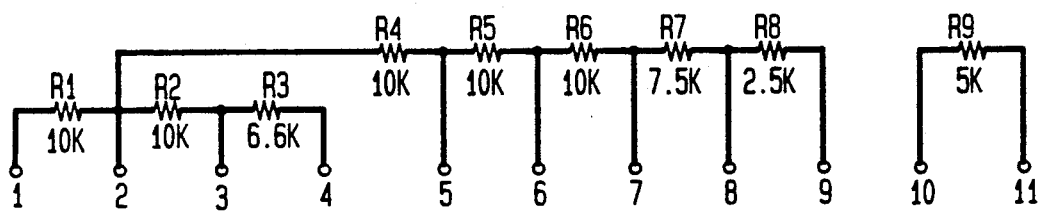
FIG. 3 is a detailed schematic representation of a resistor network making up part of the circuitry of FIGS. 2A-2J.

As shown in FIG. 3, resistor network 140 comprises resistors R1 through R9. The absolute tolerance of the resistors is 1%. The ratio tolerance is 0.1%. The change in ratio with temperature is no more than 5 parts per milliion per °C. over the range 0° C. to +70° C. The stringent tolerance for change in ratio is selected to aid in achieving the desired accuracy for device 10.

Amplifiers 142, 146 are preferably high gain operational amplifiers, with a gain of at least 5 million and may be, for example, model OP400 amplifiers available from Precision Monolithics, Inc., Santa Clara, Calif.

Switch 144 is preferably a double pole single throw FET switch and may be a type DG 300 available from Intersil, Inc., Cuperting, Calif. or Harris Semiconductor division of Harris Corporation, Melbourne, Fla. Switch 144 is connected to resistor network 140, amplifier 142 and (through resistor network 140) to amplifier 146. Switch 144 is in a break before make configuration to eliminate transients. The rise and fall time of switch 144 is rapid, and in a preferred embodiment varies by no more than 12.5 nanoseconds from a nominal 250 nanoseconds over the temperature range of 0° C. to +70° C.

Figure 4A:
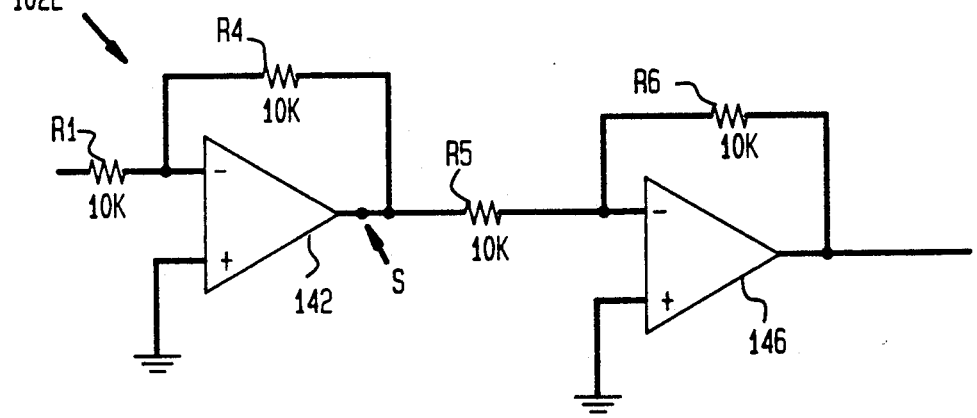
FIGS. 4A and 4B illustrate equivalent circuits to the two states of the modulator/demodulator circuit that makes of the circuitry of FIGS. 2A-2J.
Figure 4B:
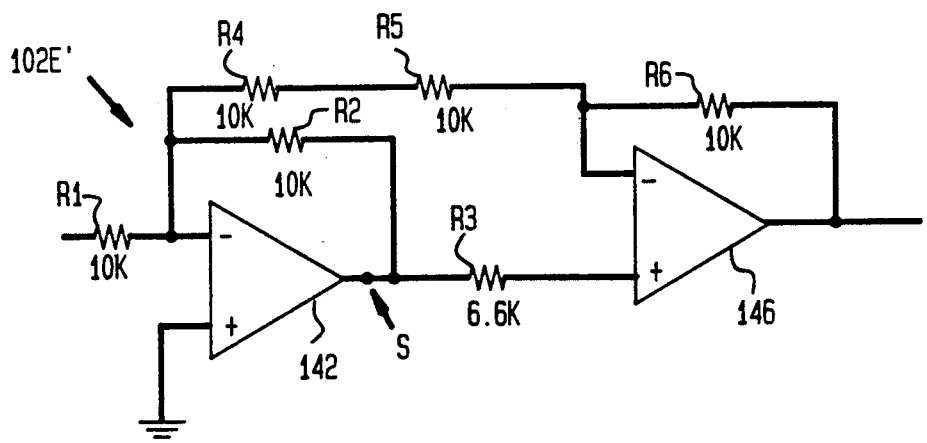

FIG. 4A is an illustration of an equivalent circuit (102E) to modulator 102 when switch 144 is in its first position (shown in FIG. 2A). FIG. 4B is an illustration of an equivalent circuit (1032E') to modulator 102 when switch 144 is in its second position.

Referring to FIG. 4A, equivalent circuit 102E is seen to be a two stage amplifier, of which the first stage comprises operational amplifier 142 and resistors R1, R4 while the second stage comprises operational amplifier 146 and resistors R5, R6. The location of switch 144 in equivalent circuit 102E is shown by point S.

The gain for the first stage of circuit 102E is given by gain equation $$G_1 = -R4/R1 = -10k/10k = -1 \quad (1)$$

The gain for the second stage of circuit 102E is given by $$G_2 = -R6/R5 = -10k/10k = -1 \quad (2)$$

The total gain for circuit 102E is therefore $$G_T = G_1 * G_2 = -1 * -1 = 1 \quad (3)$$

Turning now to FIG. 4B, equivalent circuit 102E, also is a two stage amplifier. The first stage comprises op amp 142 and resistors R1, R2, R4, R5. The second stage of circuit 102E' comprises op amp 146 and resistors R4, R5, R6. Resistor R3 may be disregarded because of the high input impedance of op amp 146. As in FIG. 4A, the location of switch 144 in equivalent circuit 102E' is shown by point S.

The gain for the first stage of circuit 102E' is given by $$\begin{aligned} G'_1 &= -1/R1 * ((R4 + R5) * R2/(R4 + R5 + R2)) \\ &= -1/10 * ((10 + 10) * 10/(10 + 10 + 10)) \\ &= -1/10 * (200/30) = -2/3 \end{aligned}$$

The gain for the second stage of circuit 102E' is given by $$\begin{aligned} G'_2 &= 1 + (R6/(R4 + R5)) \\ &= 1 + (10/(10 + 10)) = +3/2. \end{aligned} \quad (5)$$

The total gain for circuit 102E' is $$G'_T = G'_1 * G'_2 = -\tfrac{2}{3} * 3/2 = -1 \quad (6)$$

It will be noted that changes in the position of switch 144 change the effective gains of op amps 142, 146.

In operation, modulator 102 receives a precision 5 volt d.c. potential from reference voltage generator 148 (FIG. 2A). The +5V potential is applied to the inverting input of amplifier 142 through resistor R1. The 1 KHZ timing signal from flip-flop 138 is applied to switch 144. Switch 144 changes its position on each positive and negative edge of the 1 KHZ timing signal, so that switch 144 is repeatedly driven between its first and second positions in a 1 KHZ cycle. When switch 144 is in its first position, the total gain of modulator 102 is +1, so that the output potential of amplifier 146 (which also may be considered the output of modulator 102) is equal to the input potential +5V. When switch 144 is in its second position, the total gain of modulator 102 is −1 so that the output potential of amplifier 146 is equal to −5V, which is minus one times the input potential. As a result of the 1 KHZ timing signal applied to switch to switch 144, the output of modulator 102 is a precision 1 KHZ a.c. square wave of amplitude 10 volts, peak to peak.

Referring again to FIGS. 4A, 4B or to FIG. 2A, it will be noted that switch 144, in either position, is within the feed back loop of amplifier 142. This positioning demultiplies the on resistance of switch 144 by amplifier 142's open loop gain, which is a factor of at least five million.

Also to be noted is 33 pF capacitor 150 (FIG. 2A) which is connected across the output and the inverting input of amplifier 142. Capacitor 150 stabilizes amplifier 142 during transitions of switch 144 (50 nanoseconds worst case). Capacitor 150 also stabilizes the rise and fall time of the square wave output over variations in component characteristics due to time and temperature.

Push-pull amplifier stage 104 receives the square wave output from modulator 102 and applies it in a balanced manner to resistor bridge 25. Amplifier stage 104 comprises noninverting driving circuit 153 and inverting driving circuit 154. The noninverted square wave output by circuit 152 is applied to the positive input of resistor bridge 25 and the inverted square wave output by circuit 154 is applied to the negative input of resistor bridge 25. The respective 10V square waves are 180° out of phase and so are applied in a push-pull arrangement to resistor bridge 25, thereby developing an effective peak-to-peak differential of 20 volts across the input terminals of bridge 25 and resulting in twice the sensitivity of a system in which a push-pull five volts d.c. might be used. Also because of the balanced excitation the average output voltage of bridge 25 is essentially zero, which minimizes common mode voltage problems at the input of a.c. amplifier 40.

The differential output of bridge 25 is essentially a 1 KHZ square wave that is 180° out of phase with the excitation signal applied to bridge 25. The output of bridge 25 is applied to the inputs of amplifier 40. Amplifier 40 is preferably an instrumentation amplifier such as the model AMP02 available from Precision Monolithics, Inc., Santa Clara, Calif., or the model AD624 available from Analog Devices, Inc., Norwood, Mass. Connected to amplifier 40 is gain-setting resistor 156 (FIG. 2C). The value of resistor 156 is selected to produce the desired gain for amplifier 40. In the preferred embodiment, the full scale output of bridge 25 is 40 mV peak to peak and, as will be seen, the full scale input voltage of the A/D converter used in the preferred embodiment is 2.5V d.c.. A gain of 125 is needed at amplifier 40, so that the full scale output of amplifier 40 will be 5 volts peak to peak for demodulation by demodulator 50 to a 2.5V d.c. output at full scale. Resistor 156 is chosen to produce a gain of 125 at amplifier 40. Resistor 156 is also chosen to have a temperature coefficient that matches the temperature coefficient of amplifier 40 so that the gain remains essentially constant over changes in temperature in the intended range of operation.

The output of amplifier 40 is applied to the input of signal demodulator 50 (FIG. 2D). As will be observed by comparison of demodulator 50 with modulator 102, the circuits are substantially identical, the largest difference being in the selection of amplifiers 142', 146' of demodulator 50, which correspond to amplifiers 142, 146 of modulator 102. Amplifiers 142', 146' are selected so as to have a rise and fall time that is substantially faster, say by a factor of ten or twenty, than the rise and fall time of amplifiers 142, 146. The high relative slew rate of the amplifiers of demodulator 50 prevents the nonlinearities that would result from slew rate saturation if the rise and fall time of amplifiers 142', 146' were matched to that of amplifiers 142, 146. In a preferred embodiment, amplifiers 142', 146' are model OP470 amplifiers available from Precision Monolithics, Inc., Santa Clara, Calif. The model OP470 has a rise and fall time of 350 nanoseconds; the model OP400 selected for amplifiers 142, 146 has a rise and fall time of 7 microseconds.

The timing signal applied to switch 144 of demodulator 50, as mentioned before, lags the timing signal modulator 102 by 34 microseconds. This delay exactly compensates for the delay between modulator 102 and demodulator 50. Since the 1 KHZ square wave input signal received by demodulator 50 from amplifier 40 is 180° out of phase with the timing signal, demodulator 50 synchronously demodulates its input signal, applying a gain of minus one to the negative leg of the input signal and a gain of plus one to the positive leg of the input signal. The output of amplifier 146' is thus essentially a d.c. voltage of an amplitude that represents the force applied to load cell 20. The output of amplifier 146' passes through a low pass filter stage comprising resistors R7' and R8' and capacitor 158. The corner frequency of the filter is at 15 HZ. This greatly attenuates the 2 KHZ switch component of the output of amplifier 146'. Further, any low frequency or d.c. interference signals, such as power line interference, 1/f noise, amplifier offset, board noise, or thermoelectric effects that are input to demodulator 50 will have been mixed to 1 KHZ and will also be greatly attenuated by the low pass filter. Further filtering of high frequency noise is provided by a second filter stage.

The filtered output of signal demodulator 50 is applied to the analog input of A/D converter 60, which is preferably of the Delta Sigma type and may for example be a Model CS5503 available from Crystal Semiconductor Corporation, Austin, Tex. This device also incorporates substantial low pass filtering that provides very large attenuation of power line interference and system AC components (1 KHZ and harmonics). The full scale input of A/D converter 60 is 2.5 volts. The output of A/D converter 60, communicated serially to microcontroller 106, is a 20 bit binary word representing the amplitude of the d.c. signal received from signal demodulator 50.

The reference voltage for A/D converter 60 is provided by reference demodulator 70. The input terminal of demodulator 70 is coupled to sense terminals at the input terminals of bridge 25. The coupling of bridge 25 to demodulator 70 is through resistor network 160, which divides and inverts the excitation signals applied to bridge 25, resulting in an input to reference demodulator 70 that is an a.c. square wave, 5 volts in amplitude peak to peak and 180° out of phase with the bridge excitation signal.

Reference demodulator 70 is again virtually the same circuit as modulator 102, except that amplifiers 142" and 146" of reference demodulator 70 are relatively fast-slewing amplifiers like those of signal demodulator 50. Like signal demodulator 50, reference demodulator 70 receives a 1 KHZ timing signal that lags by 34 microseconds the timing signal for modulator 102. Reference demodulator 70 synchronously demodulates its 5 volt square wave input, thereby outputting a 2.5 volt d.c. potential. As before, the synchronous demodulation of the input signal of reference demodulator 70 mixes low frequency interference to 1 KHZ, for subsequent filtering. The first low pass filter after reference demodulator 70 differs from the filter after signal demodulator 50 in that capacitor 158', associated with reference demodulator 70, has a different value form capacitor 158, so that demodulator 70's first filter has a frequency at 0.33 Hz. As in the case of demodulator 50, a second low pass filter further attenuates high frequency noise.

B. Modification of the Force-Measuring Device in accordance with the invention

1. General description of inventive modification of Force-Measuring Device

There has been described a single range force-measuring device, in which a strain gage is excited with an a.c. square wave. There will now be described, in general terms, a modification of the device so as to provide two weighing ranges.

FIG. 5-A shows a wave form 200 of a cyclic excitation signal applied, in accordance with the invention, by modulator excitation source 30 to resistor bridge 25. It will be observed that wave form 200 is an a.c. step function and has a recurring high amplitude phase 202 and a recurring low amplitude phase 204. Each phase 202 or 204 has a positive leg and a negative leg. The amplitude of the negative leg of each phase is equal to the amplitude of the positive leg of that phase. Phases 202 and 204 alternate in cyclic fashion.

Preferably phases 202 and 204, which are illustrated as ideal wave forms, are such that the leading and trailing edges comprise ramp or step functions to moderate their effect as a source of RFI.

In a preferred embodiment of modified force measuring device 10, each phase 202 and 204 has a duration of 1 msec and each positive or negative leg thereof has a duration of 0.5 msec. Preferably the amplitude of high amplitude phase 202 is sixteen times the amplitude of low amplitude phase 204. Preferably the amplitude of phase 204 is 1 V, peak to peak and the amplitude of phase 202 is 16 V peak to peak.

As previously described, the excitation signal represented by wave form 202 is applied in a push-pull arrangement to resistor bridge 25, so that an effective differential of 20 volts is applied across the input terminals of bridge 25 during the low amplitude phase, and 320 volts during the high amplitude phase.

It will be appreciated that the output signal of bridge 25, received by amplifier 40, will also have the form of wave form 200. So, too, with an exception to be noted below, the output signal received by signal demodulator 50 from amplifier 40 has the form of wave form 200.

There will now be described in general terms operation of signal demodulator 50 to select one of the two phases of the output signal for data acquisition.

FIG. 5-B and 5-C show wave forms of the effective gain applied by signal demodulator 50 to the output signal received from amplifier 40. Wave form 212 (FIG. 5-B) has two alternating phases, a +1 gain phase lasting 1.5 msec and a −1 gain phase lasting 0.5 msec. The two phases of wave form 212 alternate in a cycle. The phases are controlled by timing signals applied to signal demodulator 50 by timing generator 80. Those timing signals cause each −1 gain phase of wave from 212 to coincide with the negative leg of high amplitude phase 202 of the signal received by signal demodulator 50 from amplifier 40. The resulting output signal of signal demodulator 50 is shown as wave form 214 in FIG. 5-D. Wave form 214 includes a series of high amplitude positive steps 216, each of which is followed (and preceded) by a low amplitude a.c. phase 218. The signal represented by wave form 214 is integrated by filtering circuitry (including resistors R7' and R8' and capacitor 158, FIG. 2D) before being applied to analog to digital converter 60. As a result the positive and negative legs of a.c. phase 218 average to zero and the signal applied to ADC 60 is essentially a d.c. potential having an amplitude equal to half the amplitude of positive steps 216. This signal is of a suitable amplitude for weighing in the more sensitive, low weight range of device 10.

Operation of signal demodulator 50 in the less sensitive, high weight range of device 10 is illustrated by wave form 220 (FIG. 5-C). Wave form 220 is the same as wave form 212, except that wave form 220 is shifted to the right (or left) by 1 msec as compared to wave form 212. That is, under the control of timing signals applied to signal demodulator 50 by timing generator 80, each −1 gain phase of wave form 220 coincides with the negative leg of low amplitude phase 204 of the signal received by signal demodulator 50 from amplifier 40. The resulting output signal of signal demodulator 50 is shown as wave form 222 in FIG. 5-E. Wave form 222 includes a series of low amplitude positive steps 224, each of which is followed (and preceded) by a high amplitude a.c. phase 226. As before, integration of this signal causes the positive and negative legs of phase 226 to average to zero and the signal applied to ADC 60 is essentially a d.c. potential having an amplitude equal to half the amplitude of positive steps 224. This signal is suitable for weighing in the less sensitive, high weight range of device 10, being one-sixteenth the amplitude of the corresponding signal of the high weigh range.

It will be noted that operation of signal demodulator 50 either as discussed with respect to FIG. 5-B (i.e. with a −1 gain phase coinciding with each negative leg of phase 202 of the amplified strain gage output signal) or as discussed with respect to FIG. 5-C (i.e. with a −1 gain phase coinciding with each negative leg of phase 202 of the output signal) respectively selects either phase 202 or phase 204 for data acquisition. It will also be noted that wave forms 214 and 222 both represent partial demodulations of wave form 200. The capability for shifts between wave forms 212 (FIG. 5B) and 220 (FIG. 5C) is achieved by modifications to the programming of microcontroller 106, which controls driving stage 108. Such modifications are well within the abilities of a person of ordinary skill in the art and need not be discussed further here for an understanding of the invention.

Figure 5A:
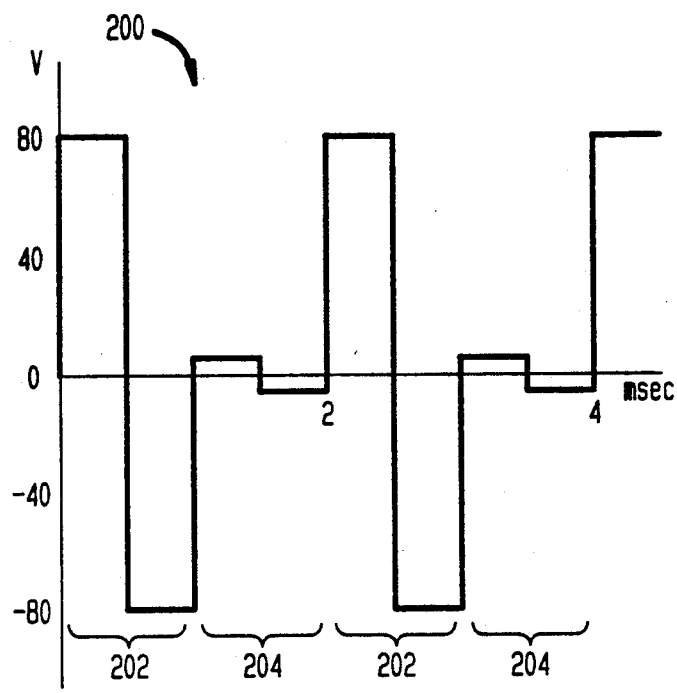
FIG. 5-A is a wave-form illustration of a cyclic strain gage excitation signal in accordance with the invention.
Figure 5B:
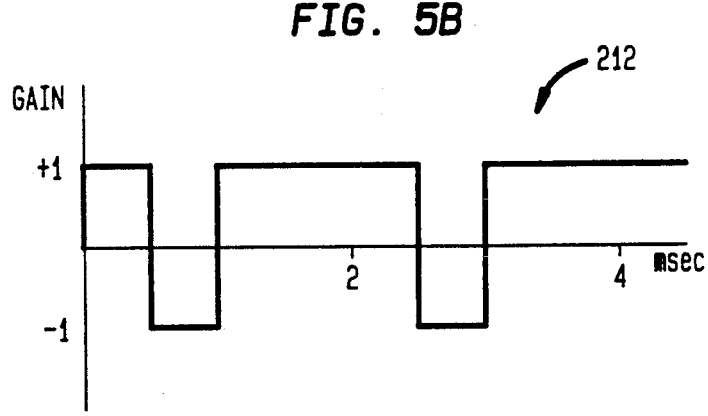
Figure 5C:
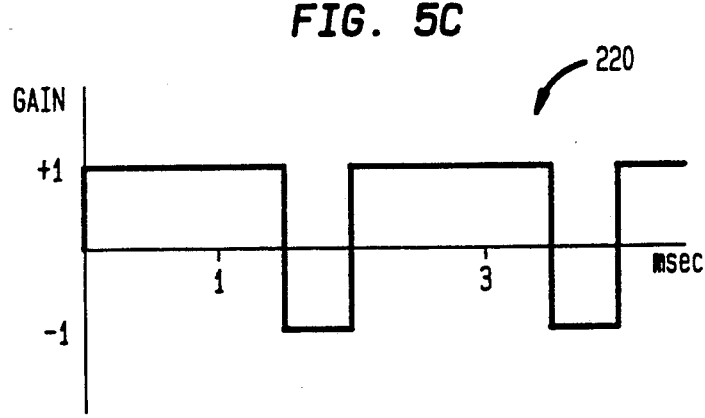
Figure 5D:
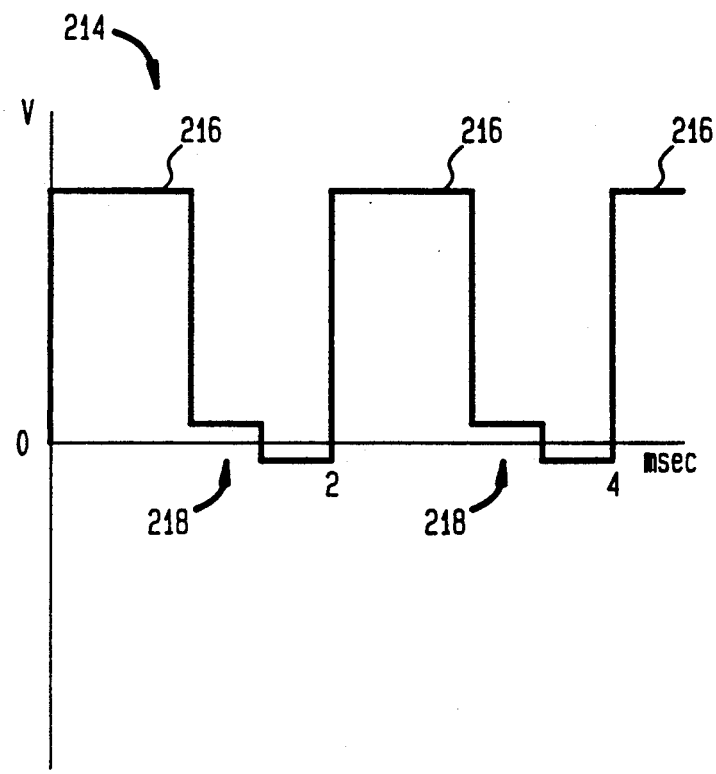
Figure 5E:
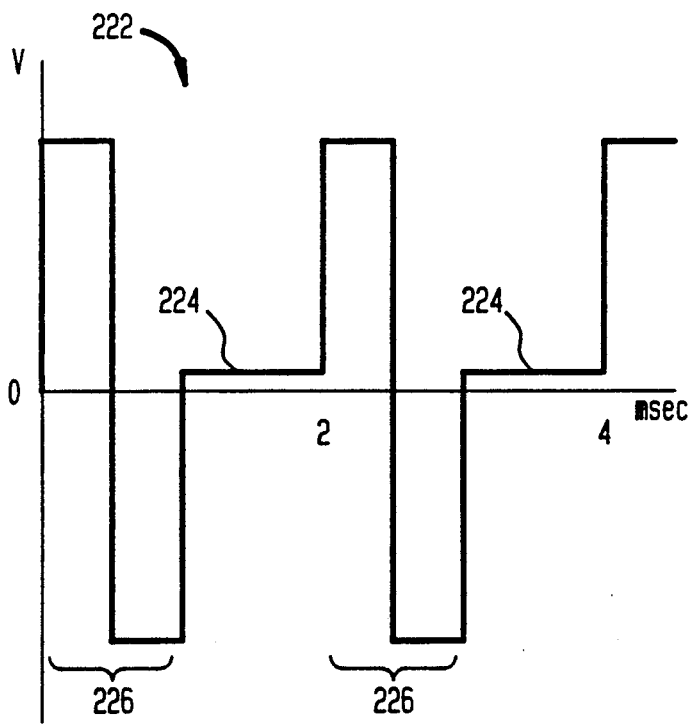

A reference potential for A/D converter 60 is provided by making substantially the same changes to reference demodulator 70 as are made to demodulator 50; with the exception that the excitation voltage is always demodulated as shown in FIG. 5E. As with the signal demodulation, phase 226 is integrated out of the reference potential so that it provides a zero average contribution and an approximately 2.5 reference potential is generated.

2. Additional details of inventive modification

Figure 6A:
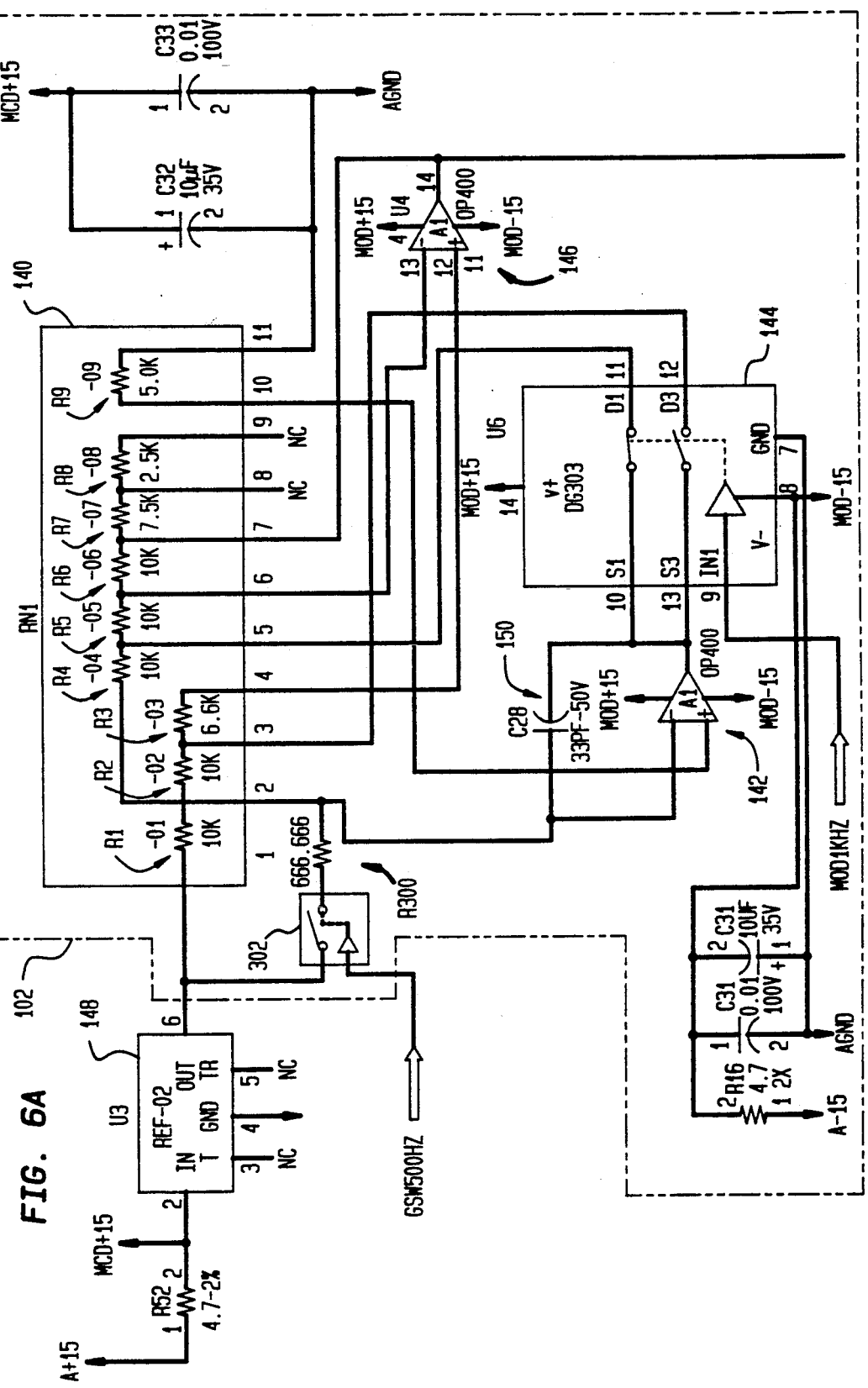
FIGS. 6A and 6B are schematic representations of modifications made, in accordance with the invention, to the force measuring device circuitry of FIGS. 2A-2J.
Figure 6B:
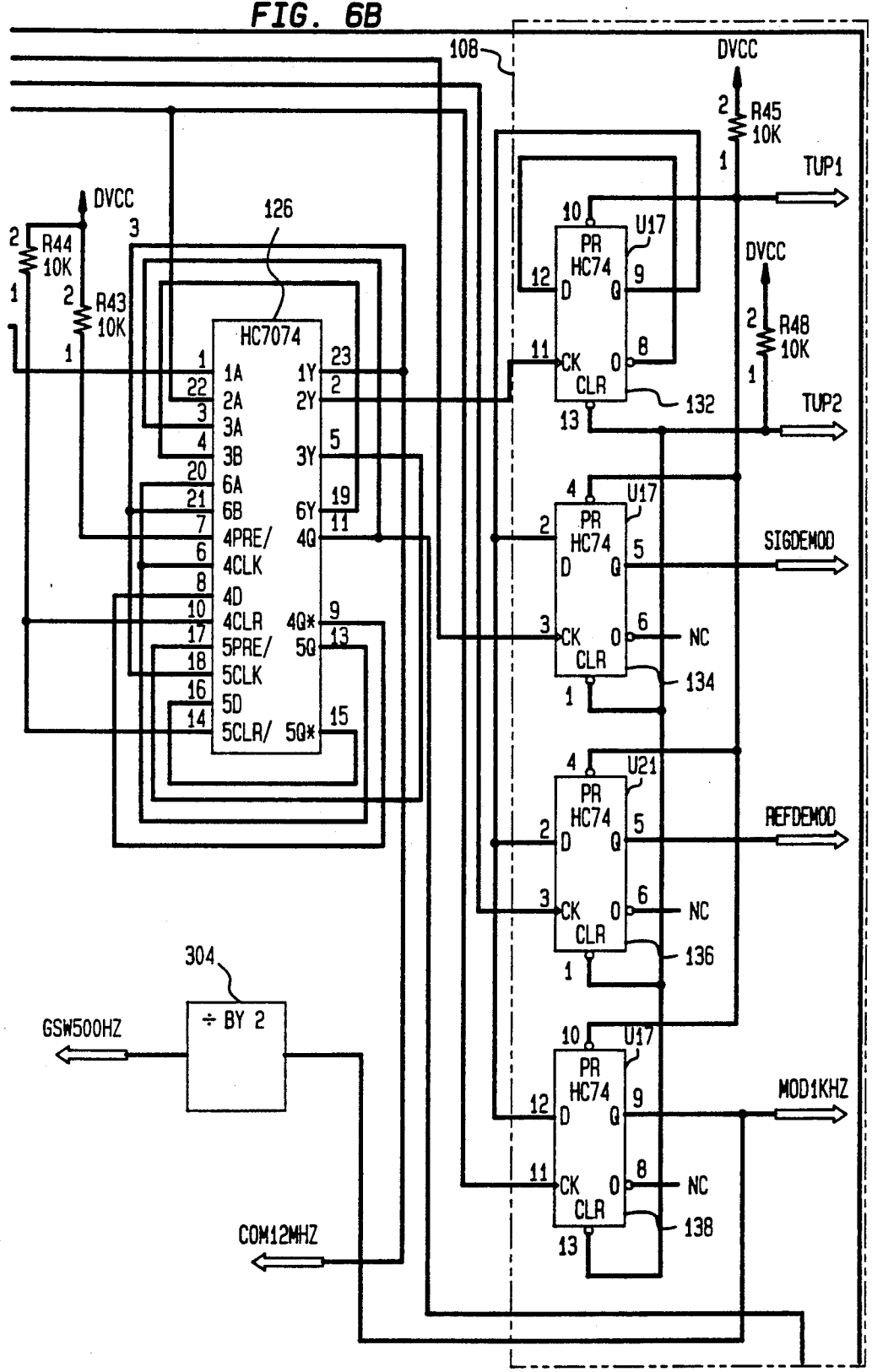

Further details of the inventive modification of device 10 will now be provided with reference to FIGS. 6A and 6B.

FIG. 6A shows a modification, in accordance with the invention, of modulator circuit 102 of FIG. 2A (which makes up part of modulator excitation source 30 (FIG. 1)). As shown on FIG. 6A, the modification consists of the addition of 666.666 ohm resistor R300 and switch 302, which is connected in series with resistor R300. Resistor 300 and switch 302 are connected in parallel with 10K ohm resistor R1 of circuit 102. Switch 302 has an open position and a closed position. When switch 302 is in its open position, modified circuit 102 of FIG. 6A is equivalent to unmodified circuit 102 of FIG. 2A, and has two states, as previously discussed, depending on the position of switch 144. The two states are respectively illustrated in FIGS. 4A and 4B, which respectively correspond to the positive and negative legs of low amplitude phase 204 of the cyclic excitation signal.

When switch 302 is in its closed position, resistor R300 is in modified circuit 102 in parallel with resistor R1. Modified circuit 102 now has two states, again depending on the position of switch 144, and illustrated respectively by FIGS. 7A and 7B.

Figure 7A:
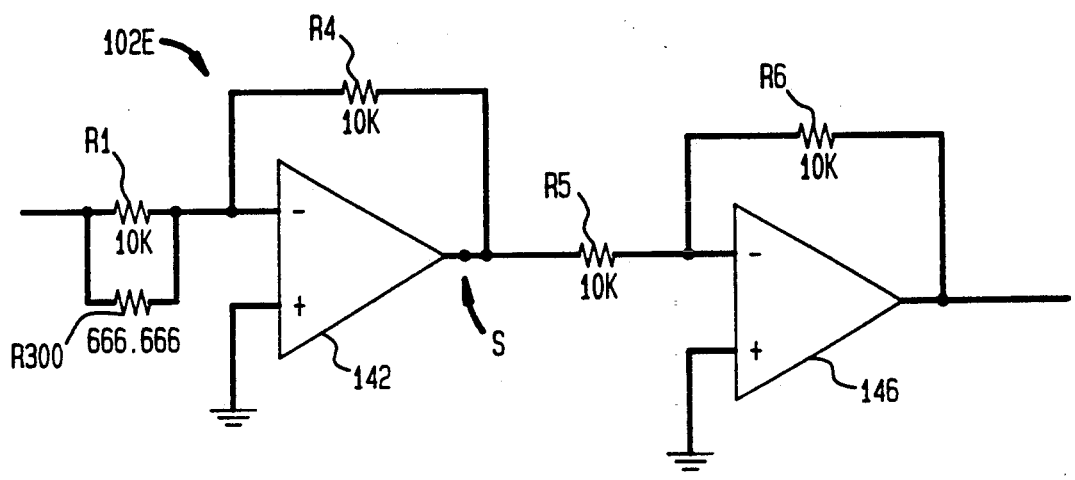
FIGS. 7A and 7B illustrate equivalent circuits to the additional two states of the modified modulator circuitry of FIG. 6A.

The gain equations for the circuit of FIG. 7A are derived from equations (1), (2) and (3) above, and are as follows:

$$G_1 = (-R4 * (R1 + R300))/R1 * R300 \quad (1')$$
$$= (-10K * (10.666666K))/6.66666M$$
$$= -16 \text{ (first stage gain)}$$

Equation (2) (second stage gain) is unchanged:

$$G_2 = -R6/R5 = -10K/10K = -1$$

The total gain for the circuit of FIG. 7A is given by:

$$G_T = G_1 * G_2 = -16 * -1 = 16 \quad (3)$$

Figure 7B:
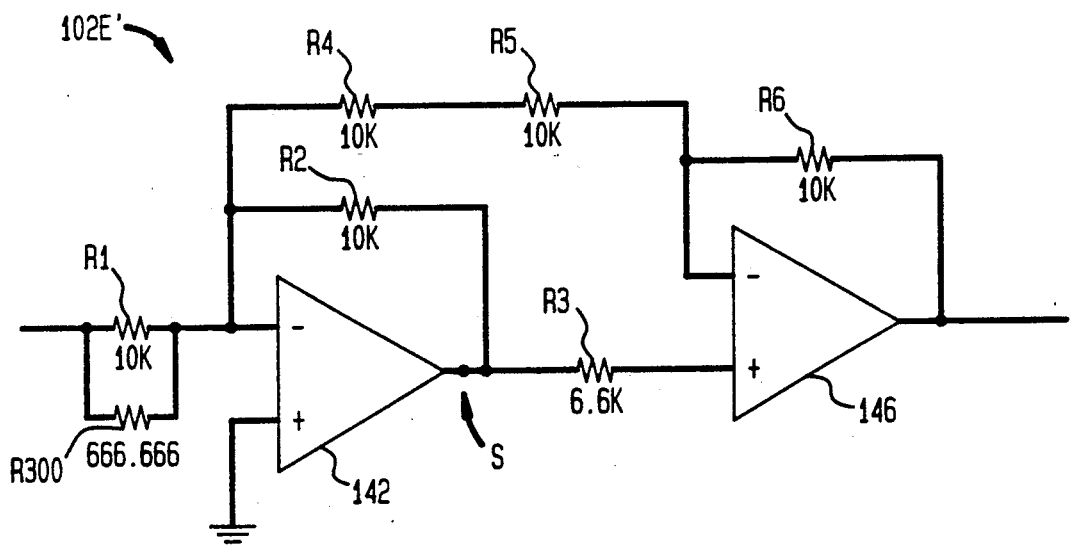

The gain equations for the circuit of FIG. 7B are derived from equations (4), (5) and (6) above, and are as follows:

$$G'_1 = (-(R1 + R300)/(R1 * R300)) * \quad (4')$$
$$(((R4 + R5) * R2)/(R4 + R5 + R2))$$
$$= (-10.666666/6.66666) * ((10 + 10) * 10)/$$
$$(10 + 10 + 10)$$
$$= -(8/5) * (200/30) = -32/3 \text{ (first stage gain)}$$

Equation (5) (second stage gain) is unchanged:

$$G'_2 = 1 + (R6/R4 + R5))$$
$$= 1 + (10/(10 + 10)) = +3/2$$

The total gain for the circuit of FIG. 7B is given by:

$$G'_T = G'_1 * G'_2 = -32/3 * 3/2 = -16 \quad (6')$$

It will be understood that the circuits of FIGS. 7A and 7B respectively correspond to the positive and negative legs of high amplitude phase 202 of the cyclic excitation signal.

A 500 HZ timing signal is applied to switch 302 (FIG. 6A), repeatedly driving switch 302 between its open and closed positions. The 500 HZ signal is synchronized with the 1 KHZ timing signal applied to switch 144, so that each change of position of switch 302 is simultaneous with a change in position of switch 144. Synchronization of the timing signal may be accomplished, for example, by deriving the 500 HZ signal from the 1 KHZ signal, as is shown in FIG. 6B, in which the output of flip flop 138 is connected to divide-by-two-circuitry 304. Divide-by-two circuitry 304, in turn, provides the 500 HZ timing signal for switch 302.

As an alternative to resistor R300, it is contemplated to use a potentiometer, such as an EEPOT, so that the ratio of the amplitudes of phases 202 and 204 may be altered.

A further modification, in accordance with the invention, to the circuitry of FIGS. 2A-2J should also be noted. When device 10 is measuring a relatively large weight, and is therefore operating in its high weight range, it is desirable to limit the amplitude of phase 202 of the output signal of amplifier 40, so as not to overload the integrating circuitry at the input of A/DC 60. Amplifier 40 is therefore preferably selected to be a conventional limiting control amplifier.

Figure 8:
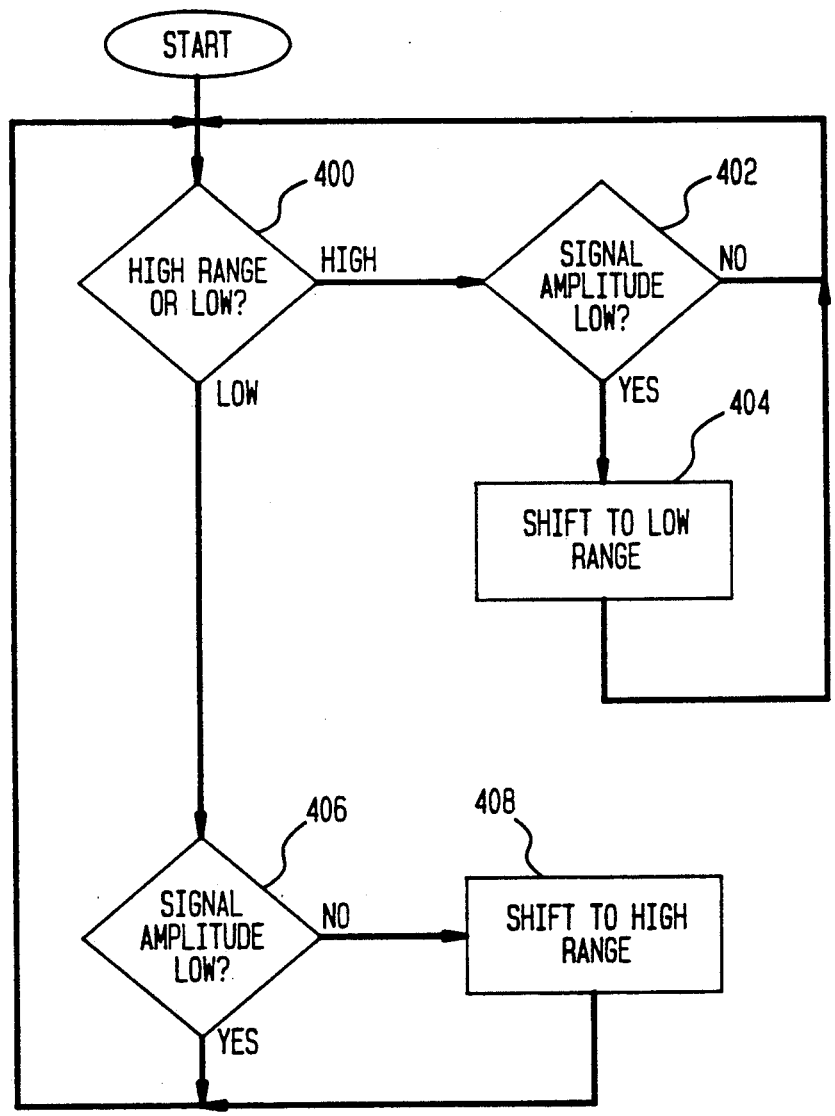
FIG. 8 is a flow chart that illustrates a software routine for determining, in accordance with the invention, whether to operate the modified force measuring device in a high weighing range or in a low weighing range.

Referring now to FIG. 8, there will be described a software routine for determining whether to operate device 10 in its high weight range or its low weight range. It will be understood that the object code for the routine may be stored in a program memory such as a ROM, addressable by the above mentioned microprocessor. Neither the ROM nor the microprocessor are specifically shown, but both may be considered included in data interpretation circuitry 90 (FIG. 1).

The routine of FIG. 8 begins with step 400, at which it is determined whether device 10 is currently operating in the high or low weight range. This may be accomplished, for example, by reference to a flag which by its state indicates the current weight range. If at step 400, device 10 is found to be in the high weight range, the routine proceeds to step 402, at which it is determined whether the output signal of load cell 20 (as reflected by the digital word output by A/DC 60) is below a threshold for switching to the low weight range. If not, the routine loops back. If so, the routine proceeds to step 404, at which device 10 shifts to the low weight range. The shift to the low weight range entails (a) shifting data acquisition from phase 204 to phase 202 of the load cell output signal, (b) adjusting data interpretation to reflect the data acquisition phase shift and (C) changing the state of the weight range flag. Tasks (a) and (b) will be described below. After step 404, the routine loops back.

Returning now to step 400, if device 10 is found to be in the low weight range, step 406 follows step 400. At step 406 it is determined whether the output signal of load cell 20, as reflected by the digital word output by A/DC 60, is below a threshold for switching to the high weight range. It will be appreciated that the threshold used at step 406 need not be the same as the threshold used at step 402. If at step 406 the signal is above the threshold, the routine loops back. Otherwise the device 10 shifts to its high weight range (step 408), in which case data acquisition is shifted from phase 202 to phase 204, data interpretation is adjusted to reflect the data acquisition phase shift and the state of the weight range flag is changed. The routine then loops back.

The routine of FIG. 8 has been shown as an endlessly looping routine, but can readily be implemented as a routine that is repeatedly called at regular intervals by a mainline or monitor program.

Shifting data acquisition from one phase to another will now be described. Referring to FIG. 5-B, it will be recognized that the timing signals applied to signal demodulator 50 consist of a pair of signals separated by 0.5 msec, with pauses of 1.5 msec between each pair. The first signal of each pair causes the beginning of the −1 phase of the wave form and the second signal causes the end of the −1 phase. As previously discussed, the −1 phase coincides with the negative leg of phase 202 of the wave form of FIG. 5-A.

In order to transform the wave form of FIG. 5-B into that of FIG. 5-C, all that is required is a shift of 1.0 msec. This may be accomplished simply by lengthening one of the pauses between signal pairs by 1.0 msec. Alternatively, one of the pauses may be shortened by 0.5 msec. In either case, the wave form of FIG. 5-C is produced, with the −1 gain phase now coinciding with the negative leg of phase 204. It should be noted that transforming the wave form of FIG. 5-C to that of FIG. 5-B is again accomplished by either lengthening or shortening by 1.0 msec one of the pauses between signal pairs.

Initialization of the weight range flag will now be described. Upon initialization of device 10, it is necessary to determine whether signal demodulator 50 is being operated in accordance with FIG. 5-B (low weight range) or FIG. 5-C (high weight range). This may be accomplished by shifting the data acquisition phase, as by the method described above, and then determining whether the signal seen by AD/C 60 has increased or decreased. If that signal has increased, then the weight range flag is set to reflect the low weight range. If the signal decreased, then the flag is set to reflect the high weight range. If a default range, such as the low weight range, is to be established on initialize, the state of the flag is tested immediately after the initial setting, and a data acquisition phase shift is implemented if necessary.

The subject invention has been described as utilizing a two-phase cyclic excitation signal to provide two weighing ranges. It is, however, also within the contemplation of this invention to provide three or more weighing ranges by using a cyclic excitation signal having three or more phases.

Figure 9:
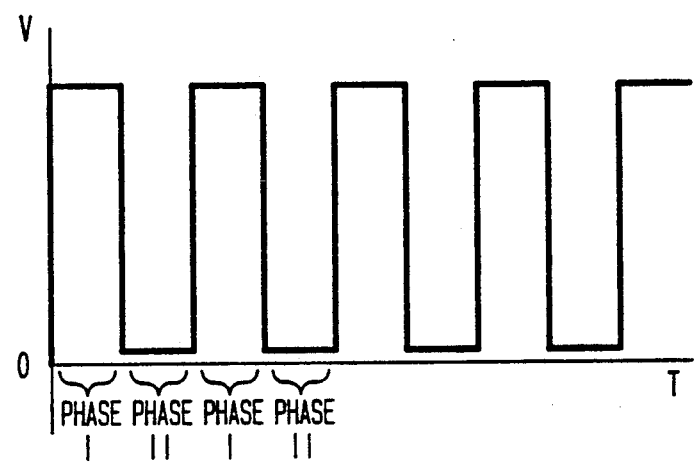
FIGS. 9 and 10 illustrate alternative cyclic strain gage excitation signals.
Figure 10:
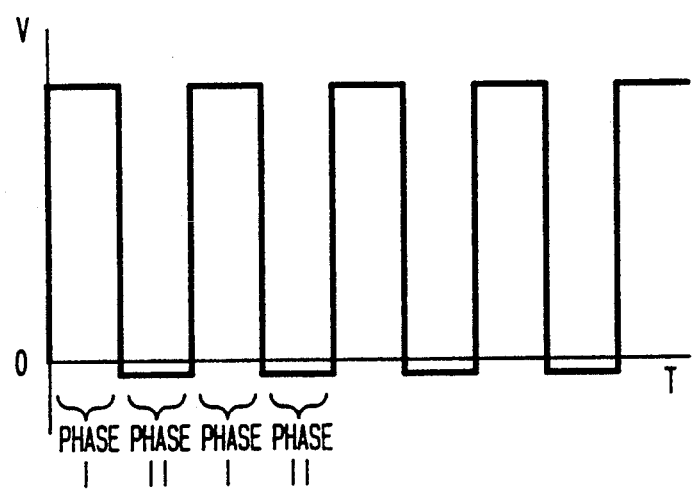

It is also contemplated, instead of the a.c. excitation signal as described above, to use a cyclic d.c. excitation signal, with each phase of the d.c. signal having a different amplitude, as shown in FIG. 9. As another alternative, illustrated in FIG. 10, a cyclic a.c. excitation signal is used, but a first phase is positive and a second phase is negative, the phases having different amplitudes. It will be appreciated that one may vary the ratios of the amplitudes of the respective phases of the signals illustrated in FIGS. 9 and 10.

While the invention has been disclosed and described with reference to a limited number of embodiments and approaches, it is apparent that variations and modifications may be made therein and it is therefore intended in the following claims to cover each such variation and modification as falls within the true spirit and scope of the invention.

What is claimed is:

1. A method of changing the sensitivity of a transducer, comprising the steps of:
   (a) applying a cyclic excitation signal to said transducer, said excitation signal having a plurality of recurring phases of different amplitudes;
   (b) receiving an output signal from said transducer, said output signal having a like plurality of recurring phases corresponding to said phases of said excitation signal; and
   (c) selecting for data acquisition one of said recurring phases of said output signal.

2. The method of claim 1, wherein said excitation signal is an a.c. signal.

3. The method of claim 2, wherein said excitation signal comprises a high amplitude phase and a low amplitude phase.

4. The method of claim 3, wherein each of said phases consists of a positive leg and a negative leg, each said leg of a phase having the same amplitude as the other leg of that phase.

5. The method of claim 4 wherein said high amplitude phase has an amplitude that is essentially sixteen times the amplitude of said low amplitude phase.

6. The method of claim 4, wherein said excitation signal consists of said high amplitude phase and said low amplitude phase, and said selecting step comprises synchronously demodulating one of said phases and not demodulating said other phase, whereby said output signal is partially demodulated.

7. The method of claim 6, further comprising the step of converting said partially demodulated output signal into a digital output signal by applying said partially demodulated output signal to an analog-to-digital converter.

8. The method of claim 7, further comprising the step of shifting said digital output signal a number of binary places to reflect selection for data acquisition of one of said phases of said output signal from said transducer.

* * * * *